United States Patent

[11] 3,617,225

| [72] | Inventors | Heinz Kuehne<br>Oberhoechstadt, Taunus;<br>Manfred Dietze, Offenbach, Taunus; Franz<br>Hauer, Frankfurt am Main, all of Germany |
|---|---|---|
| [21] | Appl. No. | 832,874 |
| [22] | Filed | Mar. 21, 1969 |
| [45] | Patented | Nov. 2, 1971 |
| [73] | Assignee | Vickers-Zimmer Aktiengesellschaft<br>Planung und Bau von Industrieanlagen |
| [32] | Priority | June 22, 1967 |
| [33] | | Germany |
| [31] | | 33,924 |
| | | Original application May 24, 1968, Ser.<br>No. 731,754, now Patent No. 3,499,873.<br>Divided and this application Mar. 21, 1969,<br>Ser. No. 832,874 |

[54] POLYCONDENSATION APPARATUS
13 Claims, 29 Drawing Figs.

[52] U.S. Cl. .................................................. 23/285,
159/11 B, 159/25, 261/92, 261/88, 23/1, 23/263,
259/9, 259/10, 259/109, 259/110, 260/75 M
[51] Int. Cl. ...................................................... B01j 1/00,
C08f 1/98

[50] Field of Search.......................................... 23/285,
263, 1; 260/75 M; 261/92, 91, 88; 159/11 B, 25;
55/232; 259/9, 10

[56] References Cited
UNITED STATES PATENTS

| 1,893,667 | 1/1933 | Darlington .................. | 261/92 UX |
|---|---|---|---|
| 2,758,915 | 8/1956 | Vodonik........................ | 23/285 |
| 3,174,830 | 3/1965 | Watzl et al..................... | 23/263 |
| 3,220,804 | 11/1965 | Bachmann et al. ........... | 23/286 |
| 3,440,019 | 4/1969 | Albrecht et al............... | 23/285 |
| 42,789 | 5/1864 | Oxnard......................... | 159/11 B |

Primary Examiner—James H. Tayman, Jr.
Attorney—Molinare, Allegretti, Newitt & Witcoff

ABSTRACT: A reactor for condensation of precondensates in the manufacture of polyester resins and similar high viscosity materials characterized by rotating annular discs within a cylindrical vessel. The discs in cross section are of thin rectangular configuration, and as they rotate, resin picked up on the disc falls from the lower edge of the annulus in a cohesive freely falling film, exposed on both sides to the vapor chamber. Such action greatly accelerates the condensation reaction.

PATENTED NOV 2 1971 3,617,225

INVENTORS
HEINZ KUEHNE
MANFRED DIETZE &
FRANZ HAUER
BY Bair, Freeman & Molinare
Attys.

INVENTORS
HEINZ KUEHNE
MANFRED DIETZE
& FRANZ HAUER
BY Bair, Freeman & Molinare
Attys.

INVENTORS
HEINZ KUEHNE
MANFRED DIETZE
& FRANZ HAUER
BY
Bair, Freeman & Molinare
Attys.

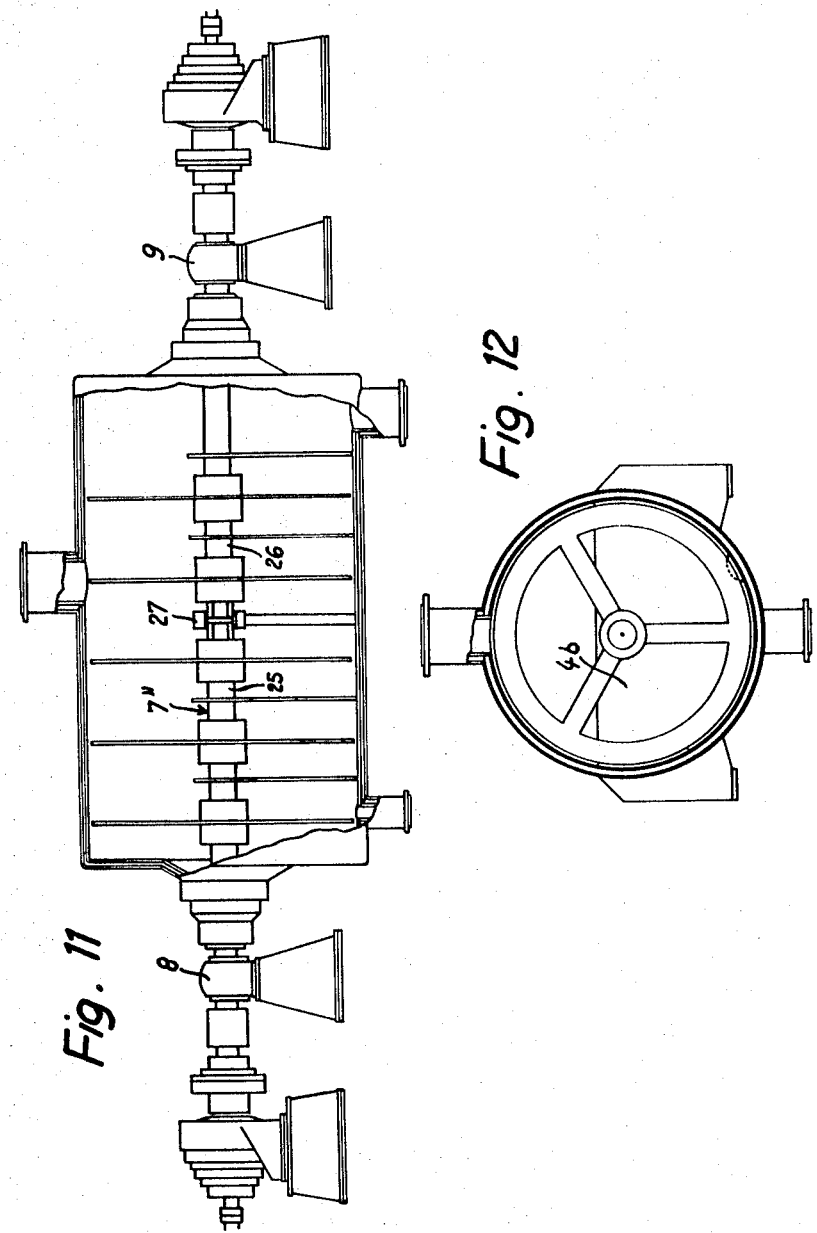

INVENTORS
HEINZ KUEHNE
MANFRED DIETZE
& FRANZ HAUER

POLYCONDENSATION APPARATUS

This application is a divisional application of our copending parent application, Ser. No. 731,754, filed May 24, 1968, for "Preparation of Polyethylene Terephthalate by Means of Free Falling Films," now U.S. Pat. No. 3,499,873.

The invention relates to an apparatus for manufacturing linear high polymers, more particularly for the further condensation of precondensates in the manufacture of polyesters, e.g., polyethylene terephthalate.

There are known continuous processes (German specification 1,207,349) for exposing a thin layer of a reacting polymer to the reaction conditions, but the ratio of the layer surface to the volume of reactant—a critical factor for the efficiency of the reactant—is limited by the surface area of the reactor used to support the layers. As these reactor surfaces are often heated metal walls, the layers in known processes have to be mechanically removed from the reactor surfaces at more or less regular intervals, so that the product does not become decomposed by the heat.

Discontinuous polycondensation processes are normally carried on in agitated autoclaves in which the reaction occurs in a thick layer of the product. Such a process requires a long reaction time, in addition to other disadvantages, because it is very difficult to remove the products of fission, e.g., gaseous ethylene glycol in the manufacture of polyethylene terephthalate, since the reacting mass is compact and has a low surface-to-volume ratio.

An object of the invention is to obviate the disadvantages of known polycondensation processes and more particularly to provide a polycondensation apparatus having means for providing a large surface-to-volume ratio in which overheating due to excessive heat supply is completely eliminated and which is suitable for continuous and discontinuous manufacture of linear polycondensates.

In a continuous mode of operation, this apparatus has the advantage of shortening the time during which the material has to remain under the reaction conditions; the polycondensation apparatus can also be considerably reduced in size. In a discontinuous mode of operation, the number of batches passing through the polycondensation apparatus can be considerably increased because of the increased speed of the reaction.

A more complete reaction, as shown by the greater intrinsic viscosities of the product, can also be achieved by the present apparatus. As the falling films in the present invention do not come into contact with heated metal walls, either in the continuous or discontinuous process, there is no danger of overheating and no need to remove the layer mechanically.

The reactor of the invention comprises a chamber, means whereby the chamber can be heated, partition walls arranged at intervals inside the chamber to form a multiplicity of communicating reaction compartments extending axially of the chamber, a precondensate inlet at one end of the chamber, a product outlet at the other end of the chamber, a space for vapor above the partition walls and common to the reaction compartments, a conduit for connecting said space to a source of vacuum, and agitator elements in the compartments, the agitator elements being approximately vertical annular discs or rings fastened by spokes to a common agitator shaft system comprising a shaft, or shafts. The annular disc is a very thin rectangle in cross-sectional shape and is of uniform thickness.

Such annular disc agitators continually lift the adhesive reacting product from the bottom of the reaction compartments. As the discs, or rings, rotate, the material runs down in films which are constantly renewed from the substance at the bottom of the compartments. As a result, particles with different degrees of polycondensation are thoroughly mixed in each compartment; mixing occurs mainly at the bottom if the material has low dynamic viscosity, but occurs increasingly in the films as the dynamic viscosity increases.

It should be noted that the reacting material is lifted in a plane substantially perpendicular to the direction of travel of the material through the reaction chamber.

The peripheral speed or speed of rotation of the discs is adjusted to form films, so that the force of gravity acting on the particles is greater than the sum of the centrifugal force and friction. It is therefore advisable to decrease the peripheral speed of the discs during the reaction, as the material increases in viscosity.

The invention will now be further described in detail with reference to the examples shown in the drawings, in which:

FIGS. 1–16 are longitudinal and cross sections of various embodiments of the device for working the process according to the invention;

Figure 1:
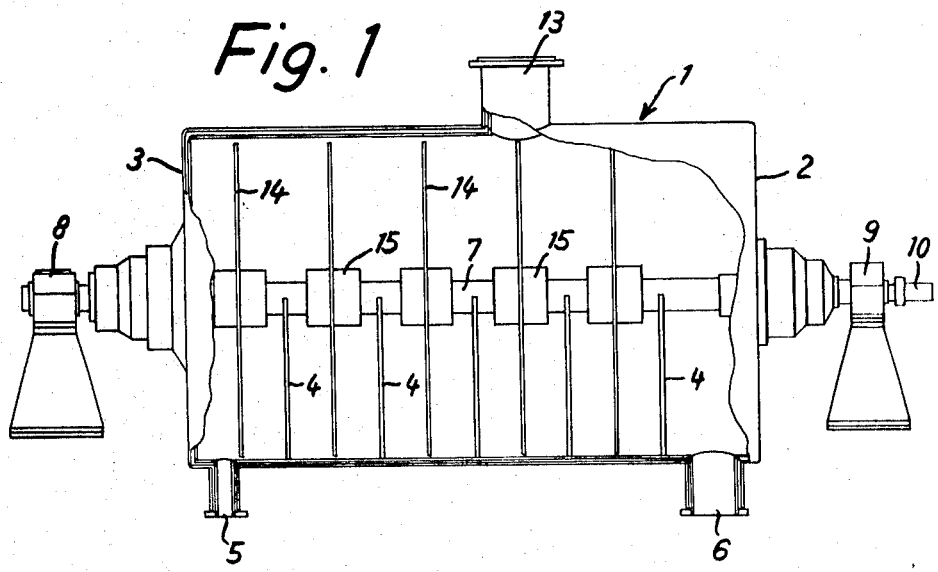

The main features of the polycondensation reactor according to the invention will now be described, first with reference to FIGS. 1 and 2. The horizontal container 1 preferably should be a double-walled cylinder with double-walled ends 2, 3. The space between the two container walls forms a heating jacket through which a suitable gaseous or liquid heat-exchanging medium, e.g., biphenyl, can flow. Heating can, however, be provided partly or completely by electric resistance band heaters passing around the outside of container 1, which need not have double walls if the heating is provided entirely by resistances. The heating can equally well be provided, in whole or part, by other known stationary heat radiators. The heating can also be arranged so that the compartments are maintained at different temperatures—e.g., if a heating jacket is used in the manner shown, by having partition walls between the container walls, so as to form separate heating chambers. To facilitate assembly and maintenance, the container can be made of a number of sections, preferably fitted together by flanges.

The lower part of container 1 has stationary partition walls 4 which, in this embodiment, reach vertically up to the middle of the chamber. The precondensate inlet 5 terminates in the first reaction compartment, which is defined by the end wall 3 and the first partition wall, and product outlet 6 is connected to the last compartment, which is defined by the last partition wall and end wall 2. The agitator shaft system 7 is coaxial with the container and passes in vacuumtight manner through end walls 2 and 3. The shaft system 7 is rotatably supported on stationary bearings 8 and 9 outside the container and is connected at one end 10 to a suitable rotating drive, e.g., an electric motor with a variable speed gear (not shown). Container 1 is stationary and supported by feet 11 (FIG. 2) attached thereto. Above the partition walls 4 there is a vapor space 12 common to and communicating with all the reaction compartments and connected via sleeves to a conduit 13 leading to a source of vacuum. A discharge element, e.g., a worm (not shown) is preferably attached by flanges to the product outlet 6. The flow of material through the reactor is further described below.

Annular discs 14 are fastened to agitator shaft system 7, by means of hubs 15 and spokes 16, to rotate solidly with the shaft. In the embodiment shown in FIGS. 1 and 2, there is an annular disc 14 in each reaction compartment except the last. It will be noted from the drawing that the discs 14 have, in cross section, a thin rectangular configuration of substantially uniform thickness. For continuous operation, it would be advantageous not to have an annular disc in the outlet compartment, because the reacting substance then occupies a fixed level in this compartment and can be used to adjust the residence time in the polycondensation reactor. With batch operation, on the other hand, it may be advantageous to provide an annular disc in the outlet compartment, so as to obtain a film in this compartment also.

Figure 3:
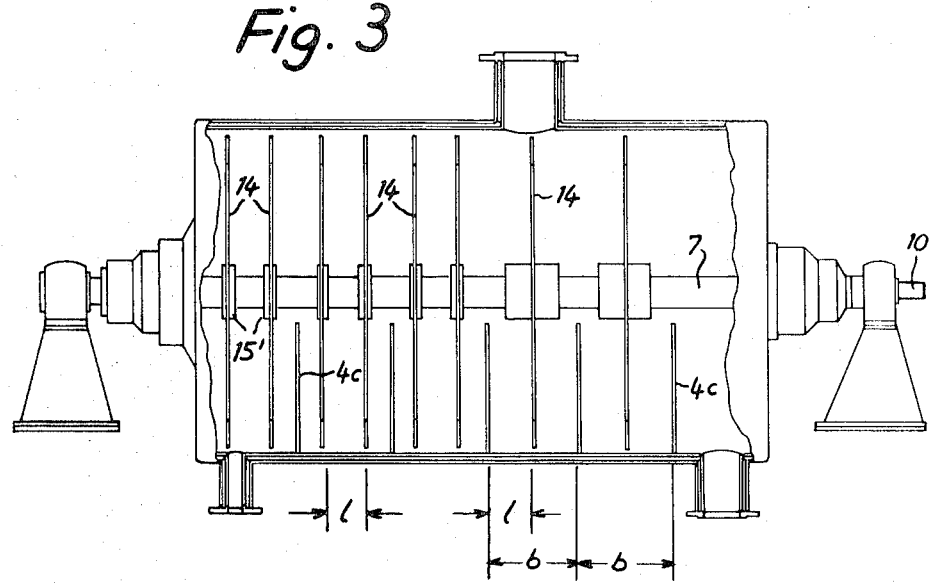
Figure 4:
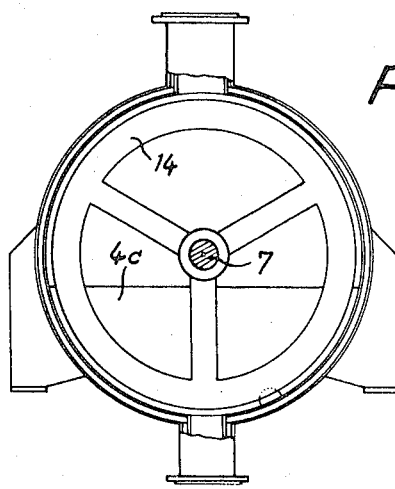
Figure 5:
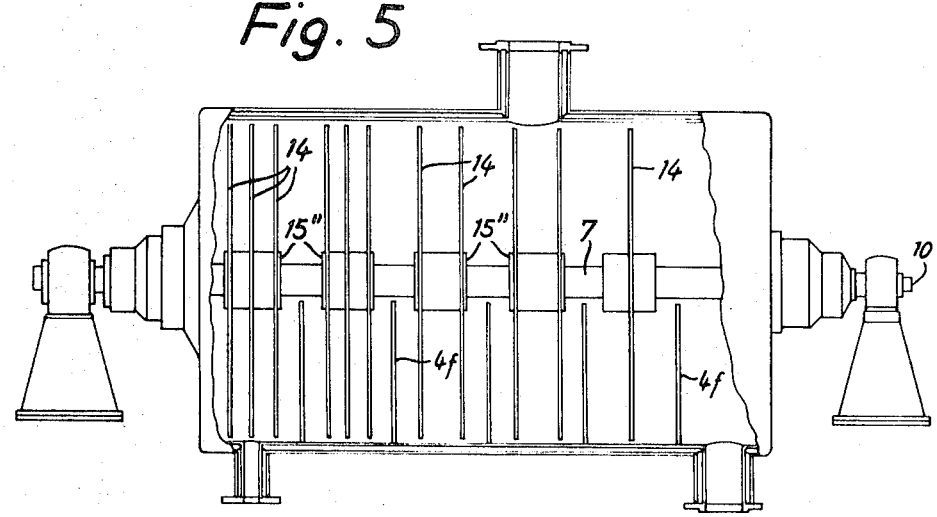
Figure 6:
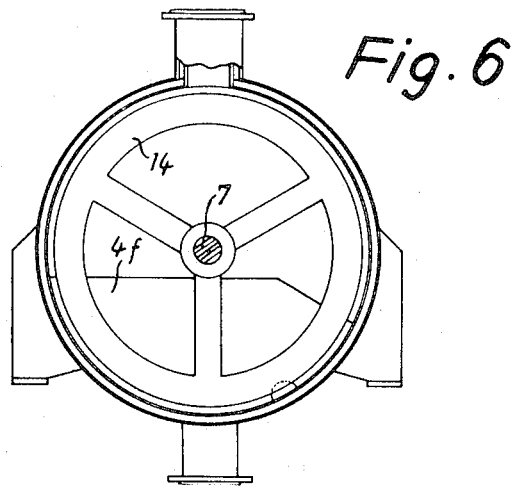

In particular, if the precondensate has low initial viscosity, it is advantageous to provide more annular discs 14 in the low-viscosity compartments, so as to increase the amount of films in the reaction chamber and the mixing effect in the bottoms. In the embodiment shown in FIGS. 3 and 4, the first three reaction compartments each have two annular discs 14, and the first two compartments in the device in FIGS. 5 and 6 have three discs 14, with two discs in the following two compartments. The examples in FIGS. 3 and 5 each have one disc in the higher-viscosity compartments, which are located near the outlet conduit 6. FIGS. 4 and 6 show partition walls 4c and 4f, respectively, which are different from each other and from those shown in FIG. 2; both walls 4c and 4f terminate vertically below the middle of the container and this feature will be described in detail below. In the device in FIGS. 3 and 4, each annular disc is fastened to a hub 15', but in the device in FIGS. 5 and 6, each hub 15'' bears two or three discs 14. It is not necessary to fasten each disc to hub 15'' by spokes; for example, one disc can have spokes and the other discs can be fastened to the first disc by webs (not shown).

In the examples in FIGS. 1 to 6, the discs rotate with the same peripheral velocity, so that substantially coherent films are formed at each disc, even though the viscosity is different in the different compartments. As a further development of the invention, however, the increasing viscosity from one compartment to another can be compensated by arranging for the discs to have a lower peripheral velocity as the viscosity increases. This can be brought about either by varying the rotational speeds of the several discs within the reactor or by varying the disc diameters, or by a combination of the two methods.

Figure 7:
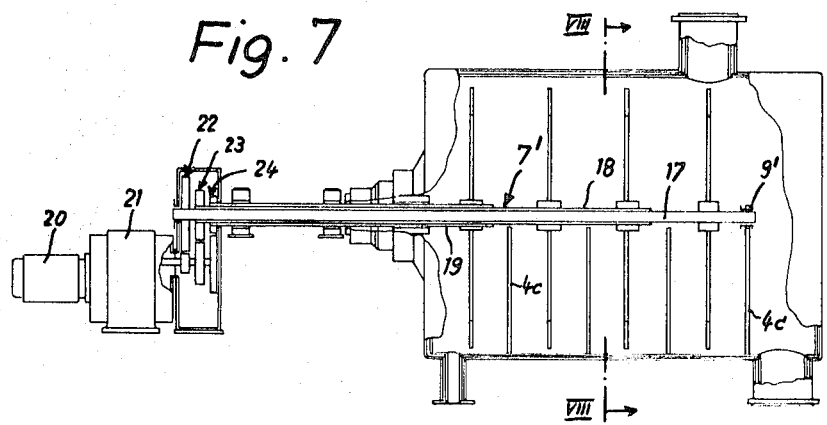
Figure 8:
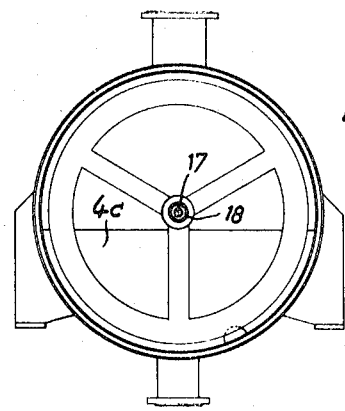

The method of varying the rotational speeds of the several discs is used in the device shown in FIGS. 7 and 8, in that the agitator shaft system 7' has discs of equal diameters on a shaft 17 and concentric hollow shafts 18 and 19. These shafts are driven at different speeds. The bearing 9' of agitator shaft system 7' is inside the container, though this is not necessary, and the bearing can be arranged in the manner described with reference to FIGS. 1 and 2. Of course, the bearing remote from the drive end can be disposed inside the container in all the embodiments. Shaft 17 and hollow shafts 18 and 19 are driven by an electric motor 20 via a variable speed gear 21 and pairs of gear wheels 22, 23 and 24 with different transmission ratios. As can be seen, hollow shaft 19 has the fastest rotational speed and shaft 17 is the slowest. Partition wall 4c is shown in operation in FIG. 8, which is a section along line VIII—VIII in FIG. 7.

The device in FIGS. 11 and 12 shows an alternative method of compensating the increase in viscosity by varying the speed of rotation with the discs having the same diameter. In this case, however, the agitator shaft system 7'' comprises two separate coaxial shafts 25 and 26 driven at different speeds from each end. Shaft 25 rotates faster than shaft 26. Each shaft has an external bearing 8 or 9 and a common internal bearing support 27. FIG. 12 shows the construction of another type of partition wall 4b.

Figure 13:
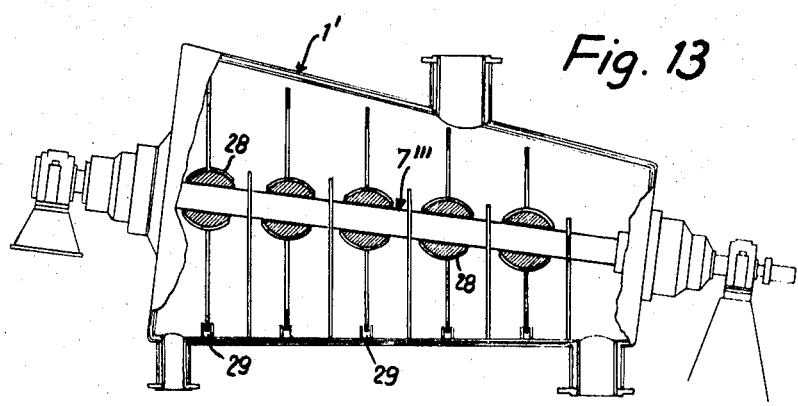
Figure 14:
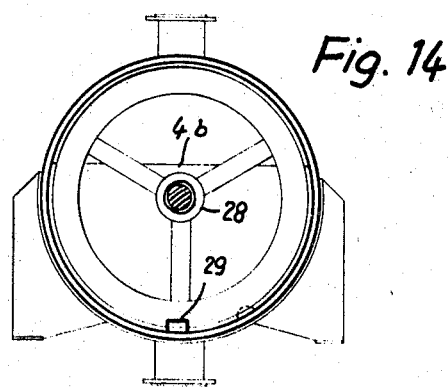

In the device according to FIGS. 13 and 14, the peripheral speed is graduated by varying the diameter of the discs; the double-walled jacket of container 1' has a frustoconical configuration corresponding to the decreasing diameter of the discs, and the lower disc generatrix is horizontal to insure a uniform level of flow of material, with the result that the agitator shaft system 7''' is at an angle to the container axis. The discs are fastened to the agitator shaft by solidly rotating ball joints 28 and are held perpendicular by stationary guide elements 29 which advantageously surround the annular discs like a fork. The advantage of this arrangement is that the agitator shaft system 7''' needs only one drive to rotate all of the annular discs to produce different peripheral velocities.

Figure 15:
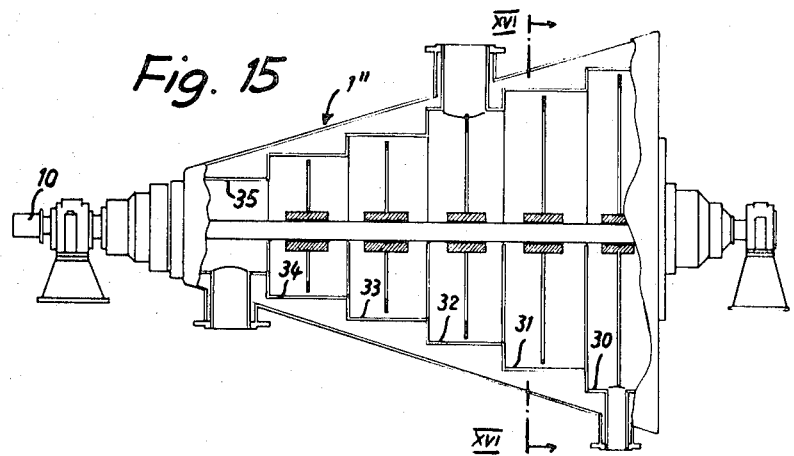
Figure 16:
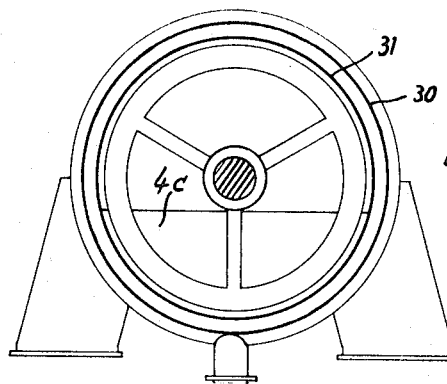
Figure 17:
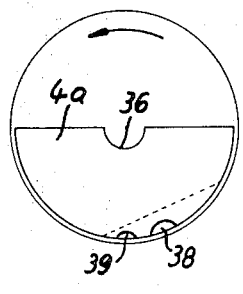
FIGS. 17–24 show various shapes of partition walls between the reaction compartments.

The same advantage is possessed by the variant in FIGS. 15 and 16, in which the internal wall of the double-walled jacket of container 1'' is made of stepped cylindrical sections 30 to 35, inclusive, corresponding to the decrease in the diameter of the discs. The partition walls, which likewise are stepped in diameter, are disposed at the transitions between the steps. In the drawing, the reaction compartments corresponding to cylindrical sections 34 and 35 have different diameters, but this is not necessary, and the outlet zone can have the same diameter as cylindrical section 34. FIG. 16, which shows the configuration of partition walls 4c, is a section along XVI—XVI in FIG. 15.

Figure 21:
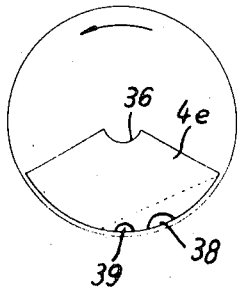
Figure 22:
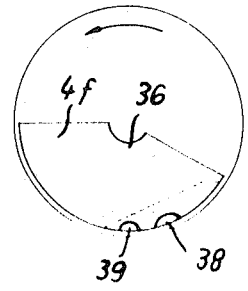
Figure 23:
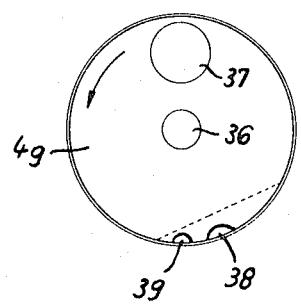
Figure 24:
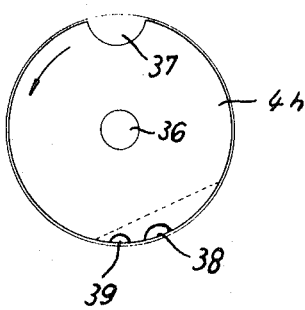
Figure 25:
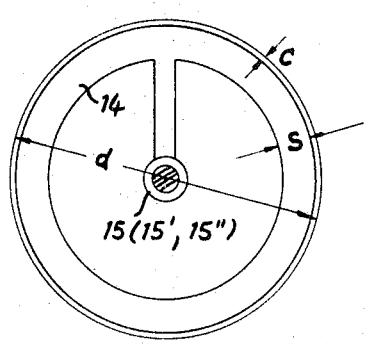
FIGS. 25–28 show some embodiments of the annular discs.
Figure 26:
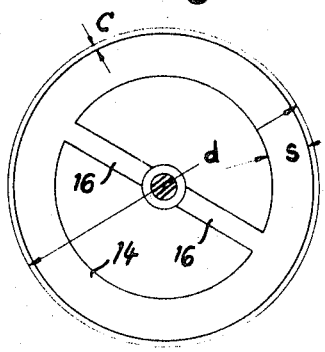
Figure 27:
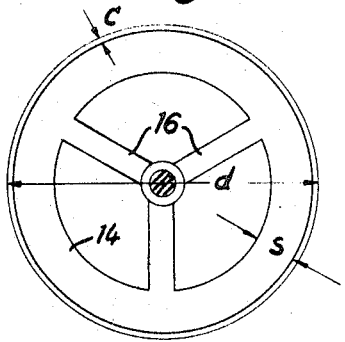
Figure 28:
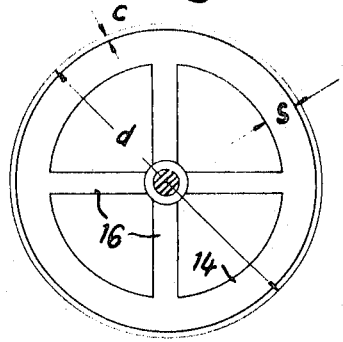

As FIGS. 17 to 20 show, the partition walls 4a, 4b, 4c and 4d can be segments of a circle with horizontal upper edges. In the embodiments in FIGS. 21 and 22, partition walls 4e and 4f are sectors of a circle. The walls 4g and 4h, on the other hand, are complete circles, as can be seen in FIGS. 23 and 24. Walls 4a, 4d, 4e and 4f terminate vertically in the middle of the vessel: wall 4b extends above the middle and wall 4c ends below the middle. In the first two cases, the walls are formed with openings 36 through which the agitator shafts pass. Walls 4g and 4h are formed with similar openings 36, and the upper parts of these walls are also formed with openings 37 to enable vapor to pass through. Walls 4a to 4h all have an opening 38 for the product; since the bottom product is displaced in a direction shown by the arrow when the discs rotate, opening 38 is somewhat out of center. A further opening 39 can be formed in the middle of each partition wall, so that the apparatus can run empty. Openings 38 and 39 can alternatively be replaced by a single segment-shaped opening, as indicated by the dotted lines.

Figure 29:
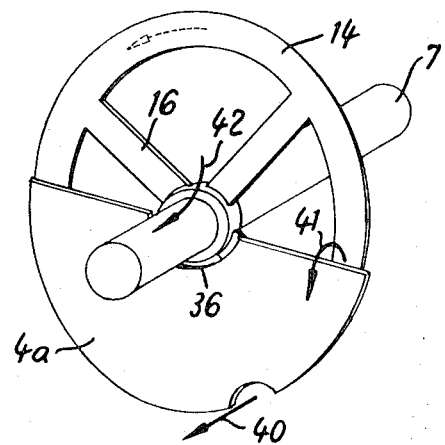
FIG. 29 is a perspective view of a single partition wall and annular disc for showing the main paths along which the material can flow inside the device according to the invention.

As FIG. 29 shows, the product in the reactor can be sent along three main paths if the partition walls have an appropriate shape. Arrow 40 indicates the path through openings 38, arrow 41 shows the path over the partition walls along the side where the product is lifted by the discs, and arrow 42 shows the path along the agitator shaft. If the walls are suitably shaped, the flow along the agitator shaft and over the partition walls can be reduced during continuous operation so that the material flows from one reaction compartment to another along a path with a definite cross section. If the through-put and the type of reaction are known, the size of openings 38 and possibly 39 are the main factors determining the pressure loss required for free flow and consequently determining the extent to which compartments are filled and the residence time. The openings 39 may be advantageously made larger from one partition wall to another, in the direction of increasing viscosity.

As stated, the residence time can be regulated over a wider range by means of the level of the material in the last reaction compartment, which does not contain an agitator. To this end, it is an advantage for the product to flow mostly through openings 38 and possibly 39. If the residence time is varied over a smaller range, this may with advantage be done by altering the peripheral velocity of the discs. If, however, the dynamic viscosity varies between approximately 0.5 and 50,000 poises, the extent to which compartments are filled cannot be greatly varied by altering the speed of rotation, since care must be taken to insure that films are formed.

Partition walls 4c in the device in FIGS. 15 and 16, which are suitable only for continuous operation, must not be formed with openings 38 or 39, so that the reacting material can be transported upwards along the container steps in the direction of arrows 41 and 42 (FIG. 29).

FIGS. 25 to 28 show that discs 14 are fixed by one or more spokes 16 to hubs 15, 15' or 15''. It is preferred that not more than four spokes are attached to each disc, as otherwise the exposed area of films will be reduced.

To obtain the best material flow and reaction in the device according to the invention, it is important to observe the following conditions (cf. FIGS. 25 to 28):

The annular width $s$ of the discs should be from about 0.01 to 0.2 times the internal container diameter $d$;

The distance $c$ between the internal container wall and the discs should be about 0.01 or more times the internal container diameter $d$, and The distance $b$ (see FIG. 3) between partition walls should be between about 0.1 and 0.4 times the internal container diameter $d$.

Distance $l$ (see FIG. 3) between the discs in a compartment or between the discs and the partition walls may be calculated from the following equation:

$$25 \text{ (mm.)} \leq l \text{ (mm.)} \leq b/2 \text{ (mm.)}$$

Figure 9:
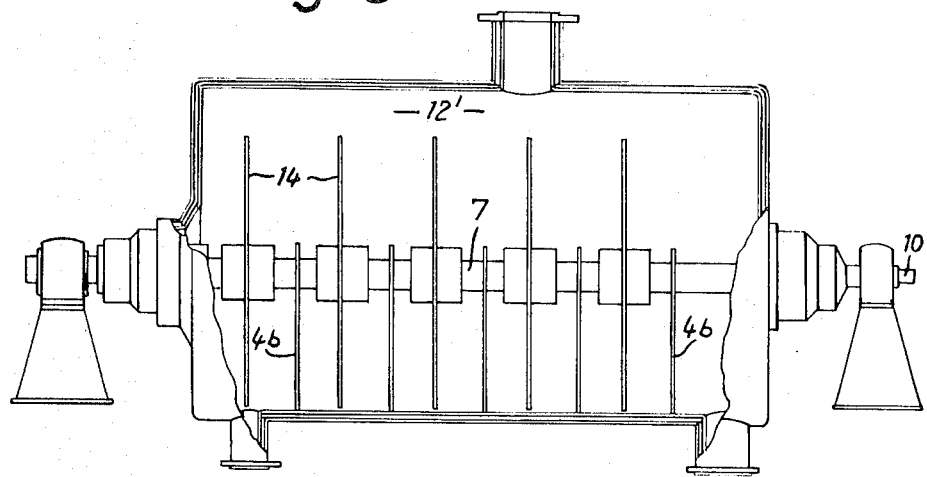
Figure 10:
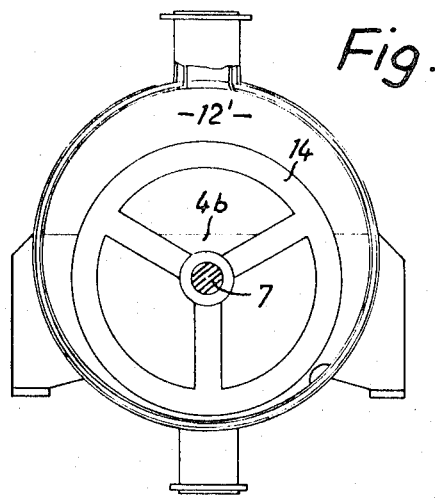

At high viscosities, it may be advantageous for the agitator shaft system 7 to be eccentric with respect to the container axis so that discs 14 come closest to the wall in the lower part of the container. This arrangement is shown in FIGS. 9 and 10. In this case, care is taken to insure that the vapor space 12' is above the discs, to prevent the formation of completely coherent films which might break up the vapor space at the compartment boundaries. In the devices described however, the same effect can be achieved by a trough-shaped vapor space extending outwards above the discs and extending along the whole length of the container (this is not shown in the drawings). Alternatively, the vapor space can be outside the container and connected by sleeves to each reaction compartment.

The polycondensation reactor according to the invention has produced the unexpected result that the residence time can be controlled within narrow limits without using special methods of forced flow. Reactors according to the invention have a very simple design and can be used to manufacture high-quality products in an economic manner. The process and apparatus according to the invention can be used to obtain ranges of residence times which are almost identical with those in ideal agitator cascades.

The method according to the invention and the preferred embodiments for working the method is or are suitable for general application to reactions in the liquid phase in which the dynamic viscosity varies between approximately 0.5 and 50,000 poises.

Sample tables will now be given, showing the manufacture of polyethylene terephthalate by polycondensation according to the invention. Examples I, II and III show the continuous process and example V shows batchwise operation. Example IV describes a comparative experiment made in a conventional autoclave with agitator.

EXAMPLES I TO III

Figure 18:
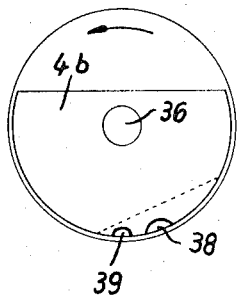
Figure 19:
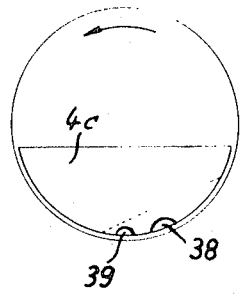
Figure 20:
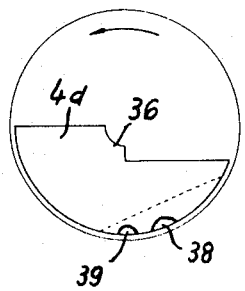

| | I | II | III |
|---|---|---|---|
| Throughput (kg./day) | 800 | 1,000 | 6,600. |
| Catalyst | Antimony triacetate | Antimony triacetate | Germanium dioxide. |
| Concentration of catalyst (wt. %, referred to dimethyl-terephthalate) | 0.04 | 0.04 | 0.014. |
| Diameter of reactor d (mm.) | 700 | 700 | 1,300. |
| Number of stirred compartments | 5 | 5 | 8. |
| Shape and arrangement of agitators in each compartment | 3-2 annular discs, 2-1 annular disc. | 3-2 annular discs, 2-1 annular disc. | 3-2 annular discs, 5-1 annular disc. |
| Type of partition wall | Figure 18 | Figure 18 | Figure 20. |
| Temperature of product at outlet (° C.) | 285 | 284 | 273. |
| Pressure (torr) | 0.8 | 1.6 | 2.5. |
| Average residence time (h) | 3.0 | 2.0 | 1.6. |
| Speed of rotation (min.$^{-1}$) | 5 | 20 | 10. |
| Peripheral speed of agitator (m./sec.) | 0.18 | 0.72 | 0.67. |
| Intrinsic viscosity*: | | | |
| Inlet | 0.24 | 0.15 | 0.15. |
| Outlet | 0.8 | 0.5 | 0.45. |
| Ratio of $b$ to $d$ | 0.21 | 0.21 | 0.14. |
| Ratio of $s$ to $d$ | 0.114 | 0.114 | 0.077. |
| Number of spokes | 4 | 4 | 4. |

*Measured with a solvent mixture containing 2 parts phenol to 3 parts tetrachlorethane, 20° C. Ostwald viscosimeter.

EXAMPLES IV AND V

Figure 2:
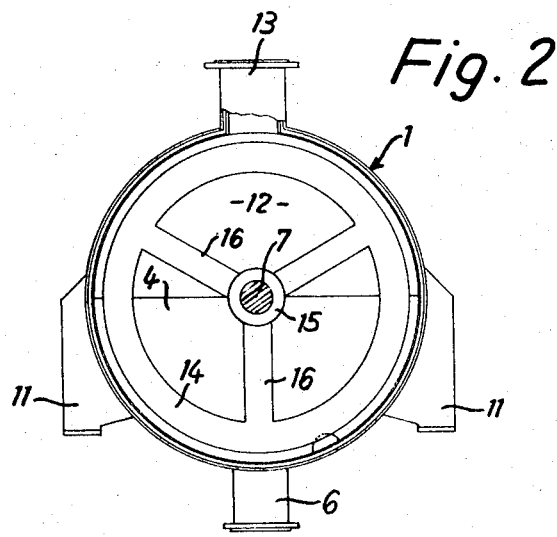

| | IV | V |
|---|---|---|
| Type of reactor | Vertical container with agitator. | Horizontal container with agitator, as in Figs. 1, 2. |
| Diameter of reactor (mm.) | 600 | 700. |
| Type of agitator | Apiral agitator on vertical shaft. | Annular discs as in Figs. 1, 2. |
| Temperature control (° C.) | Rising to 275° in 3 hours, then constant at 275°. | At 270° for 1½ hours, then at 275°. |
| Pressure control (torr) | Rising to 20 in 1 hour, then 0.2 to 0.5. | Rising to 20 in 1½ hours, then 0.3 to 0.8. |
| Catalyst | Antimony triacetate | Antimony triacetate. |
| Concentration of catalyst (weight percent) | 0.04, 0.04, 0.07 | 0.04. |
| Height of reacting layer (mm.) | 350, 670, 350 | 267 when the agitator was not switched on), |
| Speed of rotation of agitator (min.$^{-1}$) | 12, 12, 12 | 1, 6 decreasing from 12 to 1 during the reaction. |
| Length of reaction (h) | 7, 9.5, 7.5 | 7, 7, 7. |
| Intrinsic viscosity at outlet* | 0.69, 0.65, 0.74 | 0.7, 0.88, >0.9. |

*Measured with a solvent mixture containing 2 parts phenol to 3 parts tetrachlorethane, 20° C. Ostwald viscosimeter.

The conditions in example I were such that a product which could be immediately spun into high-quality filament was continuously ejected from the reactor outlet. In examples II and III, the product had to undergo further polycondensation.

A comparison between the results in IV and V shows that, under similar reaction conditions, the process and apparatus according to the invention requires shorter residence times and gives considerably higher viscosity.

The invention has been described in detail with particular reference to preferred embodiments thereof, but it will be understood that variations and modifications can be effected within the spirit and scope of the invention as described hereinabove and as defined in the appended claims.

What is claimed is:

1. Apparatus for manufacturing linear high polymers comprising:
   an elongated horizontally disposed reaction chamber;
   means for heating the chamber;
   partition walls disposed at intervals inside the chamber to form a plurality of communicating reaction compartments extending axially of the chamber;
   an inlet at one end of the chamber;
   an outlet at the other end of the chamber;
   a vapor space above said partition walls and common to all of the reaction compartments;
   a conduit connecting said vapor space to a source of vacuum;
   a shaft mounted for rotation within said chamber parallel to the axis thereof;
   film-forming annular discs mounted on said shaft within some of said compartments,
   each of said discs having smooth, continuous flat opposed surfaces and a cross section of thin, rectangular configuration of substantially uniform thickness;
   thin, flat spokes extending between the circumference of said shaft and inner circumference of said annular discs and lying in the plane of said discs to secure the disc to the shaft leaving large open spaces between said spokes;
   means for rotating said shaft; and
   means for controlling the peripheral speed of said discs within the range of 0.18 to 0.72 meters/sec.
whereby polymer picked up on said flat opposed surfaces may flow by gravity down said surfaces and off the inner circumference of the disc in the form of a freely falling film.

2. The apparatus of claim 1 in which some of said partition walls have openings therethrough near the bottom of said chamber.

3. The apparatus of claim 1 wherein the width of the annular discs is from about 0.01 to 0.2 times the internal diameter of the chamber.

4. The apparatus of claim 1 in which some of said compartments have a plurality of discs.

5. The apparatus of claim 1 wherein said annular discs are spaced apart at a distance of from about 0.1 to 0.4 times the internal diameter of said chamber.

6. The apparatus of claim 1 in which said speed controlling means includes means for rotating said discs near said product outlet end of the chamber at a slower peripheral speed than the discs near the inlet end of the chamber to compensate for an increase in the viscosity of the polymer.

7. The apparatus of claim 6 wherein said disc-rotating means comprises as said shaft, a plurality of concentric hollow shafts, and said rotating means drives said shafts at different speeds so that the peripheral speeds of the annular discs within said compartments will decrease with increase in viscosity of the polymer toward said outlet.

8. The apparatus of claim 6 wherein said disc-rotating means comprises as said shaft two separate coaxial shafts extending into the chamber from opposite ends and having separate drives connected to said rotating means for rotating said shafts and the discs within said compartments at different speeds.

9. The apparatus of claim 1 wherein the annular discs in successive compartments decrease in diameter from said inlet end towards said outlet end.

10. The apparatus of claim 1 wherein the discs in successive compartments decrease in diameter from the inlet end towards the outlet end of the chamber, the chamber wall between its ends having a frustoconical configuration corresponding to the decrease in the diameter of the discs, the lower generatrix of the chamber being horizontal and said shaft being inclined along the chamber axis, the annular discs being fixed to the shaft by ball joint means arranged for rotation with the shaft, and the discs being held approximately perpendicularly by stationary guide elements.

11. The apparatus of claim 1 wherein the discs in successive compartments decrease in diameter from the inlet end towards the outlet end of the chamber, at least the interior of the chamber wall between its ends is made of stepped cylinder sections corresponding to the decrease in diameter of the discs, and wherein the partition walls forming the compartments are located at the step boundaries.

12. The apparatus of claim 1 wherein the shaft is mounted eccentrically with respect to the chamber axis so that the discs approach closest to the wall in the lower part of the chamber.

13. The apparatus of claim 1 wherein the reaction compartment immediately communicating with said outlet end has no annular disc therein.

* * * * *